United States Patent Office 3,178,303
Patented Apr. 13, 1965

3,178,303
DISPERSING AGENT FOR TITANIUM DIOXIDE PIGMENT
Leif Aagaard, Warren Township, Plainfield, N.J., assignor to National Lead Company, New York, N.Y., a corporation of New Jersey
No Drawing. Original application Jan. 27, 1961, Ser. No. 85,202. Divided and this application Mar. 30, 1962, Ser. No. 183,724
3 Claims. (Cl. 106—300)

The present invention relates in general to soluble compounds of titanium and phosphoric acid and more particularly to water-soluble alkali metal titanium phosphates which are sulfate-free and highly efficacious dispersing agents for pigmentary $TiO_2$, the instant application being a division of copending application, Serial No. 85,202, filed January 27, 1961.

Heretofore, compounds of titanium and phosphoric acid, such as for example a water insoluble gelatinous titanic phosphate or a mixed product of basic titanic phosphate and barium or calcined sulphate have been prepared for use as pigments; and sodium pyrophosphate and sodium hexametaphosphate have been used as dispersing agents for $TiO_2$ pigment. Moreover, Barnes, British 6,329, discloses a water soluble double pyrophosphate of titanium and sodium prepared by double decomposition from solutions of sodium pyrophosphate and basic titanium sulfate for use in textiles.

The instant invention relates to the discovery of new compounds of titanium, phosphoric acid and an alkali metal which, prepared according to the method of the instant invention are sulfate-free and superior to any previously known compounds of titanium and phosphoric acid as a dispersing agent for $TiO_2$ calciner discharge and particularly a non-chalking rutile $TiO_2$. While some grades of rutile $TiO_2$ calciner discharge are dispersed fairly satisfactorily by conventional dispersing agents such as monoisopropanolamine, sodium hexametaphosphate, sodium hydroxide, etc. these dispersing agents have not been effective with non-chalking grades of pigment which can be effectively dispersed only by first preleaching the pigment with water and washing to remove the soluble flocculating salts from the pigment prior to wet-milling.

And object, therefore, of the instant invention is to provide new compounds of titanium and phosphoric acid.

A further object is to provide sulfate-free alkali metal titanium phosphates.

Another object is to provide an improved method for making alkali metal titanium phosphates.

A still further object is to provide an improved method for wet-milling a non-chalking rutile $TiO_2$ calciner discharge by treating the latter with the novel alkali metal titanium phosphates of this invention to effect superior dispersion of the pigment in an aqueous medium.

These and other objects, features and advantages of the invention are described in greater detail in the description and of the invention which follows.

Broadly, the instant invention relates to sulfate-free water-soluble alkali metal titanium phosphates and to a process for producting the same wherein a solid phosphate of an alkali metal selected from the group consisting of sodium, potassium and lithium is mixed with an anhydrous compound of titanium and the mixture calcined at a temperature in the range of from 850–1250° C. to form a clear melt which is subsequently cooled to produce a clear water-soluble glass. The invention also contemplates milling a rutile $TiO_2$ calciner discharge, without prior washing, by treating the calciner discharge prior to or during milling with an alkali metal titanium phosphate to render the rutile $TiO_2$ calciner discharge highly dispersible in water.

In general $TiO_2$ pigments are produced by calcining hydrous $TiO_2$ obtained by hydrolysis of a titanium sulfate solution. Most pigmentary grades of $TiO_2$ are prepared by subjecting the hydrous $TiO_2$ to a precalcination treatment or treatments to improve the pigmentary qualities of the calcined pigment. To these ends treating agents such as potassium or sodium sulfates or hydroxides, aluminum sulfate, compounds of phosphorus, antimony oxide, zinc or tin oxide, and mixtures thereof, are added to a water slurry of the washed titanium hydrate after which the slurry is deliquored and dried prior to being introduced into the calciner.

The potassium and sodium sulfates as well as the phosphorus compound are added to prevent sintering, to decrease chalking and to insure soft pigment while the aluminum sulfate insures good color. The oxides of zinc and tin are added to facilitate conversion of the crystals to the rutile modification and to reduce chalking.

It was the practice, prior to the invention disclosed in U.S. Patent 2,933,408, Dempster et al. to add a dispersing agent such as sodium phosphate, sodium hexametaphosphate, or monoisopropanolamine to the calciner discharge prior to or during milling to disperse the pigment, which otherwise would be flocculated due to the presence of sulfate ions. This treatment not only required relatively large and uneconomical amounts of dispersing agents but the dispersing agents were effective only with certain types of pigment. For example those pigmentary materials that were treated prior to calcination with salts of potassium and zinc to form a non-chalking rutile pigment were never effectively dispersed by the aforesaid dispersing agents. Under these circumstances one expedient used to overcome this problem is that disclosed in the aforementioned Dempster et al. patent wherein the calciner discharge is washed with water prior to adding the dispersing agent.

The instant invention has its concept in the discovery of new compounds of titanium and phosphoric acid which are effective dispersants for rutile $TiO_2$ calciner discharge of both the chalking and non-chalking grades, and eliminate the necessity for water washing treatments prior to milling. In general the water soluble alkali metal titanium phosphates of this invention are prepared by admixing a sulfate-free anhydrous titanium phosphate ($TiP_2O_7$) with an anhydrous alkali metal phosphate and calcining the mixture at a temperature sufficiently high to form a clear melt which upon subsequent cooling forms a clear water soluble glass. As an alternative procedure appropriate quantities of calcined $TiO_2$, and anhydrous alkali metal phosphate and an additional amount of alkali metal in the form of an hydroxide or carbonate are mixed together and the mixture calcined at a temperature sufficiently high to form a clear melt which upon subsequent cooling forms a clear water-soluble glass. It is also within the purview of the invention to use a sulfate-free hydrous $TiO_2$, wherein the latter is mixed with phosphoric acid and an alkali metal compound.

In preparing the alkali metal titanium phosphate by calcining a mixture of an anhydrous titanium phosphate and an alkali metal phosphate, the anhydrous titanium phosphate ($TiP_2O_7$) used may be one which is commercially available; or may be prepared by mixing, with agitation, washed and bleached $TiO_2$ hydrate at 25% solids with 87% phosphoric acid solution, the quantity of phosphoric acid added being in slight excess over that required for the weight ratio of $P_2O_5:TiO_2=1.775$. The mixture is heated to about 90° C. for 30–40 minutes and then dried and calcined at 900 to 1000° C. for about 2 hours. Sulfates and excess phosphates are driven off during calcination.

The anhydrous alkali metal phosphates which may be used in carrying out the instant invention include commercially available sodium pyrophosphate ($Na_4P_2O_7$), trisodium phosphate ($Na_3PO_4$), sodium dihydrogen phosphate ($NaH_2PO_4$) and disodium hydrogen phosphate ($Na_2HPO_4$); and the corresponding phosphates of potassium and lithium.

While the pyrophosphates are preferred it will be understood that the other forms of alkali metal phosphates may be used, the only criterion being that of providing the necessary amount of phosphate in the alkali metal-titanium-phosphate system for producing a composition having high water solubility.

In case the water soluble alkali metal titanium phosphate is prepared by calcining a mixture of sulfate-free anhydrous $TiO_2$ and an alkali metal phosphate it has been found necessary to add additional alkali metal in the form of an alkali metal hydroxide or carbonate, to provide the amount of alkali metal necessary in the $TiO_2$—$P_2O_5$—alkali metal oxide system to form an alkali metal titanium phosphate having a composition of maximum water solubility.

In this connection a series of water soluble alkali metal titanium phosphates were prepared using various amounts of anhydrous titanium phosphate ($TiP_2O_7$), prepared as described above, and the phosphates of sodium, potassium and lithium, to determine the composition range of each of the constituents used in the $TiO_2$—$P_2O_5$—alkali metal oxide system. Data showing the composition ranges of the various constituents for producing maximum water solubility are given in the table below.

TABLE I

*Water soluble alkali metal titanium phosphate glass compositions*

$Na_2O$—$TiO_2$—$P_2O_5$ SYSTEM

| Exp. No. | 1 | 2 | 3 | 4 |
|---|---|---|---|---|
| $Na_2O$, percent | 30.0 | 30.0 | 32.5 | 40.0 |
| $TiO_2$, percent | 2.5 | 10.0 | 12.5 | 5.0 |
| $P_2O_5$, percent | 67.5 | 60.0 | 55.0 | 55.0 |
| Calcn. temp., °C | 1,100 | 1,100 | 1,100 | 900 |
| Solubility | 100 | 100 | 100 | 100 |

$K_2O$—$TiO_2$—$P_2O_5$ SYSTEM

| Exp. No. | 5 | 6 | 7 | 8 | 9 | 10 |
|---|---|---|---|---|---|---|
| $K_2O$, percent | 32.5 | 35.0 | 40.0 | 42.5 | 50.0 | 52.5 |
| $TiO_2$, percent | 7.5 | 15.0 | 15.0 | 17.5 | 15.0 | 12.5 |
| $P_2O_5$, percent | 60.0 | 50.0 | 45.0 | 40.0 | 35.0 | 35.0 |
| Calcn. temp., °C | 1,200 | 1,100 | 1,100 | 1,100 | 1,100 | 1,100 |
| Solubility | 100 | 95 | 99 | 96 | 100 | 100 |

$Li_2O$—$TiO_2$—$P_2O_5$ SYSTEM

| Exp. No. | 11 | 12 | 13 |
|---|---|---|---|
| $Li_2O$, percent | 17.5 | 20.0 | 23.5 |
| $TiO_2$, percent | 5.0 | 10.0 | 7.5 |
| $P_2O_5$, percent | 77.5 | 70.0 | 69.0 |
| Calcn. temp., °C | 1,100 | 1,100 | 1,025 |
| Solubility | 98 | 98 | 100 |

By way of illustrating the preparation of a typical batch for determining the composition ranges set out in the table above, the reactants, in the form of dry, finely divided powders and in amounts required to produce 25 grams of product were weighed out and mixed by grinding in a mortar. The dry mixture was then heated in a crucible to the required temperature (850–1250° C.) to produce a clear melt which was then poured into a graphite mold and allowed to cool to room temperature. The resulting glass was then ground to a fine powder, dried and analyzed for water soluble titanium. The latter test is qualitative and carried out by boiling one gram sample in 25 ml. of water. As soon as it was evident, visually, that complete solution had occurred the sample was cooled and analyzed. In case complete solution was not obtained the heating was terminated after 30 minutes of boiling and the sample cooled and analyzed. In each instance where a complete solution was obtained the solution remained clear and fluid even after long periods of storage.

In order to further illustrate the invention the following examples are given.

*Example 1.*—20 grams of anhydrous sodium pyrophosphate ($Na_4P_2O_7$) were mixed with 5 grams of a powdered, sulfate-free, anhydrous titanium phosphate ($TiP_2O_7$) and the mixture calcined at 900° C. to form a clear melt having the composition 37.3% $Na_2O$, 7.2% $TiO_2$ and 55.5% $P_2O_5$. Upon cooling the melt the latter solidified to produce a clear glass which, when analyzed, in the manner hereinabove described, showed 100% solubility in water.

*Example 2.*—20 grams of powdered anhydrous potassium pyrophosphate ($K_4P_2O_7$) were mixed with 5 grams of a powdered, sulfate-free, anhydrous titanium phosphate ($TiP_2O_7$) and the dry mixture calcined at 900° C. to produce a clear melt having the composition 45.6% $K_2O$, 7.2% $TiO_2$ and 47.2% $P_2O_5$. Upon cooling the melt the latter produced a clear glass which analyzed substantially 100% water soluble.

*Example 3.*—20 grams of anhydrous lithium pyrophosphate ($Li_4P_2O_7$) were mixed with 5.27 grams of a finely divided, sulfate-free, anhydrous titanium phosphate ($TiP_2O_7$), and the dry mixture calcined at 1025° C. to produce a clear melt having the composition 23.5% $Li_2O$, 7.5% $TiO_2$ and 69.0% $P_2O_5$. Upon cooling the melt the latter produced a clear glass which analyzed 100% water soluble.

Additional glasses were made in accordance with the methods described above as shown in Table I.

*Example 4.*—In order to illustrate the preparation of the alkali metal titanium phosphate by using anhydrous $TiO_2$ in lieu of titanium phosphate, 1.80 grams of relatively sulfate-free calcined $TiO_2$ were mixed with 26.94 grams of sodium dihydrogen phosphate and 4.21 grams sodium hydroxide. The mixture was calcined at a temperature of 900° C. to produce a clear melt having the composition 37.3% $Na_2O$, 7.2% $TiO_2$ and 55.5% $P_2O_5$. The melt, when cooled, produced a clear glass which was substantially 100% soluble in water.

As was pointed out above the alkali metal titanium phosphates of this invention were found to be excellent dispersing agents for $TiO_2$ calciner discharge and in particular a $TiO_2$ pigment treated with compounds of potassium and zinc to have high resistance to chalking, i.e., a non-chalking pigment. The alkali metal titanium phosphates have also been shown to be highly effective as additives to classified and surface coated non-water dispersible $TiO_2$ pigments for converting them to water dispersible grades.

To illustrate the supremacy of the sulfate-free alkali metal titanium phosphates of this invention over conventional dispersing agents a series of runs were made using equal portions of rutile $TiO_2$ calciner discharge (non-chalking) which were wet-milled for 16 hours at 30–60% solids with various dispersing agents. The results of these runs are shown in Table II below.

TABLE II

*Water dispersion of non-chalking titanium dioxide pigment*

| Alkali metal-titanium phosphate dispersant | $Na_2$ | $K_2O$ | $Li_2O$ | MIPA | $K_4P_2O_7$ |
|---|---|---|---|---|---|
| Dispersant, percent | 0.70 | 1.5 | 0.70 | 0.2 | 1.65 |
| Mill solids, percent | 60 | 30 | 60 | 30 | 30 |
| Milling-hours | 16 | 16 | 16 | 16 | 16 |
| Slurry | Disp'd | Disp'd | Disp'd | Floc'd | Floc'd |
| Thruput | 95 | 95 | 98 | | |

From the data given in Table II above it is clear that a non-chalking type of rutile $TiO_2$ treated with a sulfate-free alkali metal titanium phosphate of this invention dispersed readily in water without washing whereas similar pigments treated with conventional dispersion agents, i.e. MIPA (monoisopropanolamine), potassium pyrophosphate, etc. did not disperse but instead remained flocculated.

While the foregoing description has emphasized particularly the unique dispersion effect of the sulfate-free alkali metal titanium phosphate on a type of pigment (non-chalking) most difficult to disperse it will be understood that the alkali metal titanium phosphates are equally effective on the type of pigment readily dispersed by conventional dispersing agents.

In addition to their unique dispersion properties, the sulfate-free alkali metal titanium phosphates of this invention have been found to be useful for treating certain grades of rutile $TiO_2$ pigment which normally have poor dispersion in an aqueous medium, i.e., dispersion ratings as determined by the pour point test, of less than 50%.

The pour point test (as a measure of dispersion) is carried out as follows: 50 grams of pigment are weighed into a beaker containing 400 ml. of distilled water. The pigment is stirred until thoroughly mixed adding distilled water, if necessary, from a 50 ml. burette until a free flowing slurry is obtained. The present solids by weight in the free flowing slurry is reported as the "pour point." By treating pigments of this grade with the sulfate-free alkali metal titanium phosphates of this invention dispersion ratings in an aqueous medium were increased to as high as 80%. In effect, the foregoing treatment converts a non-water dispersible type of pigment to a water-dispersible type.

From the foregoing description it is manifest that the water soluble sulfate-free alkali metal titanium phosphates of this invention are new compositions of matter which have unexpectedly unique properties as dispersants for pigment of the rutile modification and especially the grade of pigment known in the art as non-chalking pigments; and that they are also effective treating agents for converting a non-water dispersible grade of finished pigment to a water dispersible grade.

The invention may be carried out in other specific ways than those herein set forth without departing from the spirit and essential characteristics of this invention and hence the examples set out herein are, therefore, to be considered in all respects as illustrative and not restrictive of the invention, and all changes coming within the meaning and equivalency range of the appended claims are intended to be embraced therein.

I claim:

1. In the production of a $TiO_2$ pigment of the rutile modification wherein $TiO_2$ rutile calciner discharge is wet-milled and hydroclassified, the improvement comprising: rendering said calciner discharge water dispersible by adding a sulfate-free water soluble alkali metal titanium phosphate in an amount from 0.7% to 1.5% on a $TiO_2$ weight basis to said calciner discharge and milling said calciner discharge in the presence of said phosphate.

2. In the production of a non-chalking $TiO_2$ pigment of the rutile modification wherein $TiO_2$ rutile calciner discharge is wet-milled and hydroclassified, the improvement comprising: rendering said calciner discharge water dispersible by adding a sulfate-free water soluble alkali metal titanium phosphate in an amount from 0.7% to 1.5% on a $TiO_2$ weight basis to said calciner discharge, said alkali metal titanium phosphate being selected from the group consisting of sodium titanium phosphate, potassium titanium phosphate, and lithium titanium phosphate, and, in the absence of water washing, milling said calciner discharge in the presence of said phosphate.

3. In the production of a metal oxide coated $TiO_2$ pigment of the rutile modification wherein $TiO_2$ calciner discharge is wet-milled, hydroclassified and treated with a soluble metal compound to form and precipitate an insoluble metal oxide coating on said $TiO_2$, the improvement comprising: rendering said calciner discharge water dispersible by adding a sulfate-free water soluble alkali metal titanium phosphate in an amount from 0.7% to 1.5% on a $TiO_2$ weight basis to said metal oxide coated pigment, said alkali metal titanium phosphate being selected from the group consisting of sodium titanium phosphate, potassium titanium phosphate and lithium titanium phosphate and milling the metal oxide coated pigment in the presence of said phosphate.

References Cited by the Examiner

UNITED STATES PATENTS

| | | | |
|---|---|---|---|
| 1,931,682 | 10/33 | Rhodes | 106—300 |
| 1,937,037 | 11/33 | Hanahan | 106—300 |

FOREIGN PATENTS 6,329 of 1906 Great Britain.

TOBIAS E. LEVOW, *Primary Examiner.*